US012571444B2

(12) United States Patent
Son et al.

(10) Patent No.: US 12,571,444 B2
(45) Date of Patent: Mar. 10, 2026

(54) ELECTRO-MECHANICAL DRUM BRAKE

(71) Applicant: HL MANDO CORPORATION,
Gyeonggi-do (KR)

(72) Inventors: Pyeongkook Son, Gyeonggi-do (KR);
Jinseok Kim, Gyeonggi-do (KR)

(73) Assignee: HL MANDO CORPORATION,
Gyeonggi-do (KR)

( * ) Notice: Subject to any disclaimer, the term of this
patent is extended or adjusted under 35
U.S.C. 154(b) by 512 days.

(21) Appl. No.: 18/086,601

(22) Filed: Dec. 21, 2022

(65) Prior Publication Data

US 2023/0193969 A1 Jun. 22, 2023

(30) Foreign Application Priority Data

Dec. 22, 2021 (KR) ........................ 10-2021-0185395

(51) Int. Cl.
| | | |
|---|---|---|
| *F16D 65/22* | (2006.01) | |
| *F16D 51/20* | (2006.01) | |
| *F16D 66/00* | (2006.01) | |
| *F16D 121/24* | (2012.01) | |

(52) U.S. Cl.
CPC ............. *F16D 65/22* (2013.01); *F16D 51/20*
(2013.01); *F16D 2066/005* (2013.01); *F16D*
*2121/24* (2013.01)

(58) Field of Classification Search
CPC .. F16D 2121/18; F16D 2121/24; F16D 65/22;
F16D 2066/005; F16D 51/20; F16D
51/22
See application file for complete search history.

(56) References Cited

U.S. PATENT DOCUMENTS 5,913,390 A * 6/1999 Hostetler ................ F16D 51/22
188/78
2020/0056667 A1* 2/2020 Choi ....................... B60T 1/067

FOREIGN PATENT DOCUMENTS

| KR | 10-2021-0063199 | 6/2021 | |
|---|---|---|---|
| KR | 10-2021-0148283 | 12/2021 | |
| WO | WO-9937935 A1 * | 7/1999 | ............. F16D 51/20 |

OTHER PUBLICATIONS

Office Action dated Aug. 18, 2023 for Korean Patent Application
No. 10-2022-0038050 and its English machine translation by Google
Translate.

* cited by examiner

*Primary Examiner* — David R Morris
(74) *Attorney, Agent, or Firm* — WOMBLE BOND
DICKINSON (US) LLP

(57) ABSTRACT

An electro-mechanical drum brake may include a back plate,
a drum disposed on one side of the back plate, a first brake
shoe and a second brake shoe rotatably coupled on one
surface of the back plate, a pressing member configured to
press one sides of the first brake shoe and the second brake
shoe so that the first brake shoe and the second brake shoe
advance toward or retreat from an inner circumferential
surface of the drum, an actuator configured to provide a
driving force so that the pressing member presses the first
and second brake shoes, and a sensor positioned between the
other sides of the first and second brake shoes and formed to
measure loads of the first and second brake shoes applied in
a first direction tangent to a rotational radius of the drum.

19 Claims, 14 Drawing Sheets

40 : 41, 42, 43, 44, 45, 46

70 : 72, 74, 76

70 : 72, 74, 76

70 : 72, 76
80 : 82, 84, 86
90 : 92, 96

70 : 72, 76
80 : 82, 84, 86
90 : 92, 96

ELECTRO-MECHANICAL DRUM BRAKE

CROSS-REFERENCE TO RELATED APPLICATION

This application claims priority to and the benefit of Korean Patent Application No. 10-2021-0185395, filed on Dec. 22, 2021, the disclosure of which is incorporated herein by reference in its entirety.

BACKGROUND

1. Field of the Invention

The present disclosure relates to an electro-mechanical drum brake, and more specifically, to an electro-mechanical drum brake capable of precisely estimating a braking force of a brake.

2. Discussion of Related Art

In general, brake devices are devices for holding wheels of a vehicle to stop the rotation of the wheels in order for adjusting a speed of a vehicle when the vehicle travels or stopping the vehicle when braking or parking is performed.

Recently, electro-mechanical brakes (EMBs) for electronically controlling an operation of the brake have been developed. EMB is a mechanical type to replace a hydraulic brake so that a brake fluid of the hydraulic brake is not required, and an electric motor installed in the vehicle directly applies a force to generate a braking force.

Such an EMB enables precise control of the braking force as compared to a hydraulic brake and may be automatically operated by applying an autonomous traveling system, thereby implementing an improvement in driver convenience and the advancement of the vehicle.

In particular, there is increasingly a demand for EMBs capable of electronically controlling a drum brake having an advantage in price when compared to a caliper brake for generating a braking force by pressing a rotational disk with a brake pad.

In general, an EMB system measures a current applied to an electric motor and estimate a torque braking force generated by the electric motor based on the measured current using characteristics in which a current of the motor is proportional to a torque generated by the motor. Information on the estimated torque braking force may be used to control the EMB system.

However, a drum brake may additionally generate a rotational torque by a self-boosting action in which a brake shoe pressed by a drum tends to rotate with the drum and thus has the characteristic in which the torque braking force is further increased.

With the characteristics of the drum brake, there is a problem in that a large error occurs between a braking force actually generated and a braking force estimated using the current of the motor. Furthermore, the error between the actual braking force and the estimated braking force using the current may be further increased according to a change in friction coefficient between the drum and the brake shoe. Therefore, it has been urgently required to develop an electro-mechanical drum brake capable of precisely measuring a braking force in consideration of the characteristics of a drum brake.

SUMMARY OF THE INVENTION

The present disclosure is directed to providing an electro-mechanical drum brake capable of measuring a force of a brake shoe applied in a direction tangent to a rotational radius of a drum.

The present disclosure is directed to providing an electro-mechanical drum brake capable of precisely measuring a braking force of a drum brake in spite of the characteristics of the drum brake such as a self-boosting action.

The objects of the present disclosure are not limited to the above-described objects, and other objects that are not mentioned will be understood by those skilled in the art to which the present disclosure pertains.

According to one aspect of the present disclosure, there is provided an electro-mechanical drum brake including a back plate, a drum disposed on one side of the back plate, a first brake shoe and a second brake shoe rotatably coupled on one surface of the back plate, a pressing member configured to press one sides of the first brake shoe and the second brake shoe so that the first brake shoe and the second brake shoe advance toward or retreat from an inner circumferential surface of the drum, an actuator configured to provide a driving force so that the pressing member presses the first and second brake shoes, and a sensor positioned between the other sides of the first and second brake shoes and formed to measure loads of the first and second brake shoes applied in a first direction tangent to a rotational radius of the drum.

The electro-mechanical drum brake may further include a first force transmitting member positioned between the first brake shoe and the sensor so that one side of the first force transmitting member comes into contact with the first brake shoe and the other side comes into contact with one side of the sensor and a second force transmitting member positioned between the second brake shoe and the sensor so that one side of the second force transmitting member comes into contact with the second brake shoe and the other side comes into contact with the other side of the sensor.

The first force transmitting member and the second force transmitting member may be formed to slide in the first direction.

The electro-mechanical drum brake may further include a sensor housing fixedly coupled to the back plate and having an accommodating space therein to accommodate the sensor, wherein the first force transmitting member and the second force transmitting member may be coupled to the sensor housing to slide in the first direction.

The accommodating space may be formed in the first direction so that the sensor is supported after sliding in the first direction.

The first force transmitting member may include a body portion slidably coupled to the sensor housing and having one side protruding outward from the sensor housing and the other side coming into contact with the one side of the sensor and a circumferential portion provided on the one side of the body portion, and the circumferential portion may be formed to protrude outward from the body portion to have a greater radius than the body portion.

An accommodating groove for accommodating the circumferential portion may be formed in an inner wall of the sensor housing defining the accommodating space.

The electro-mechanical drum brake may further include a guide member that guides a motion of the sensor so that the sensor moves in the first direction.

The guide member may include a guide rod passing through the sensor and arranged in the first direction, and the guide rod may have both ends, each of which is coupled to one of the first and second force transmitting members.

The guide rod may be formed to move relative to the first force transmitting member and the second force transmitting member.

The guide rod may be made of an elastic material.

The other side of the sensor may be coupled to a fixing pin arranged in the first direction, and a fixing pin groove into which the fixing pin is inserted may be formed in the second force transmitting member.

The fixing pin may be formed so that a length of a portion inserted into the fixing pin groove is shorter than or equal to a depth of the fixing pin groove in a state in which the sensor and the second force transmitting member are in contact with each other.

The first brake shoe may rotate about a first axis, and the other side of the first brake shoe may be positioned on a side opposite to one side of the first brake shoe with respect to the first axis.

The electro-mechanical drum brake may further include a controller installed on the back plate and electrically connected to the actuator and the sensor, wherein the controller may be formed to estimate braking forces by the first brake shoe and the second brake shoe based on information acquired from the sensor and information acquired from the actuator.

An electrical line for electrically connecting the sensor and the controller may be provided on the other surface of the back plate.

According to another aspect of the present disclosure, there is provided an electro-mechanical drum brake including a back plate, a drum disposed on one side of the back plate, a first brake shoe rotatably coupled to one surface of the back plate, a pressing member configured to press one side of the first brake shoe so that the first brake shoe advances toward or retreats from an inner circumferential surface of the drum, an actuator configured to provide a driving force so that the pressing member presses the first brake shoe, and a sensor having one side connected to the other side of the first brake shoe and the other side formed to be supported by the back plate and formed to measure a load applied in a first direction tangent to a rotational direction of the drum.

The first brake shoe may be a leading shoe.

The electro-mechanical drum brake may further include a sensor housing fixedly coupled to the back plate and having an accommodating space therein to accommodate the sensor, wherein the other side of the sensor may be supported by an inner wall of the sensor housing defining the accommodating space.

The electro-mechanical drum brake may further include a force transmitting member including a body portion slidably coupled to the sensor housing and having one side protruding outward from the sensor housing and the other side coming into contact with the one side of the sensor and a circumferential portion formed on the one side of the body portion, wherein the circumferential portion may be formed to protrude outward from the body portion to have a greater radius than the body portion.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
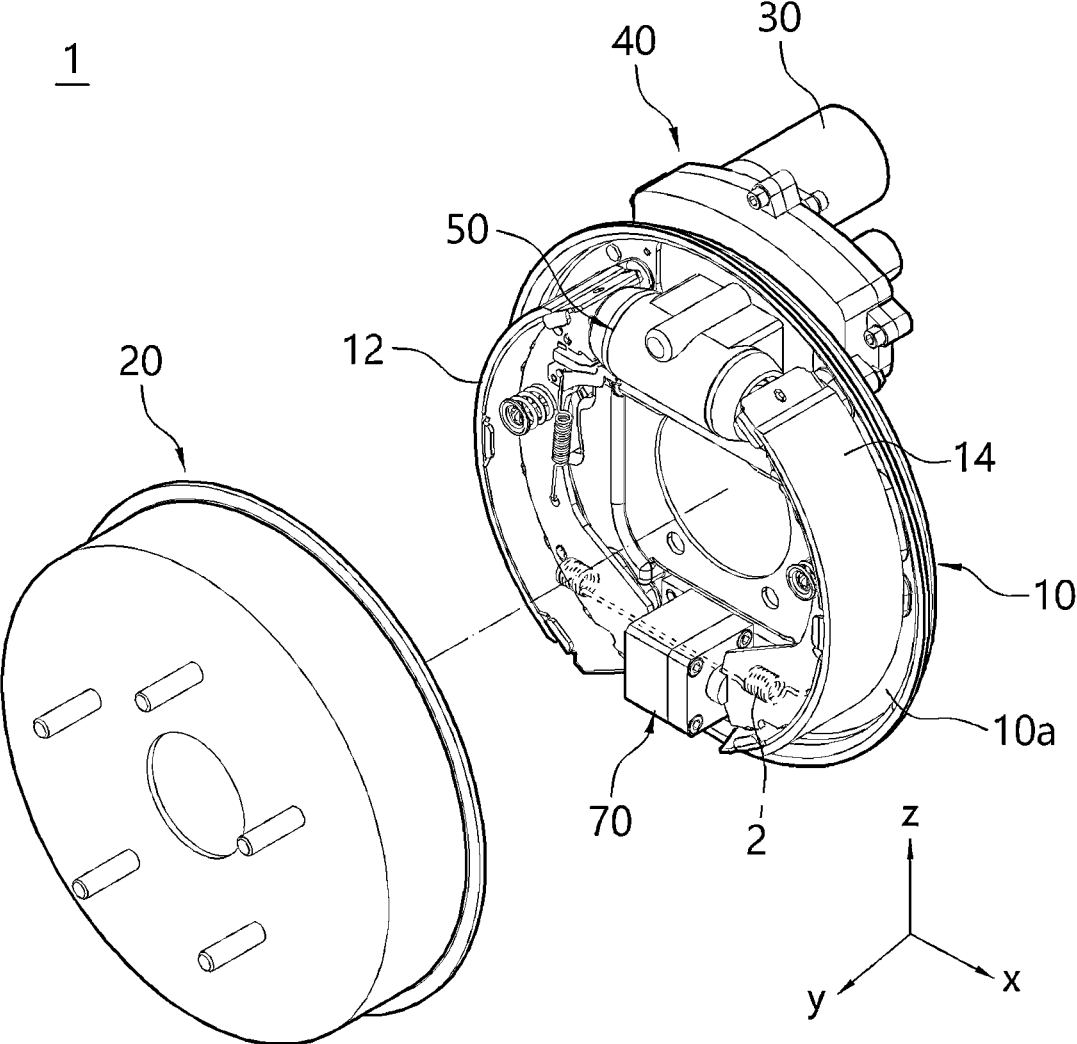
FIG. 1 is an exploded perspective view of an electro-mechanical drum brake according to a first embodiment of the present disclosure.

Hereinafter, embodiments of the present disclosure will be described in detail with reference to the accompanying drawings so that those skilled in the art to which the present disclosure pertains may easily carry out the embodiments. The present disclosure may be implemented in several different forms and is not limited to the embodiments described herein. In order to clearly describe the present disclosure, portions irrelevant to the description are omitted from the drawings, and the same reference numerals are given the same or similar components throughout the specification.

Words and terms used in the specification and the claims should not be construed as being limited to their ordinary or dictionary meanings and should be construed as the meaning and concept consistent with the technical spirit of the present disclosure in accordance with the principle that the inventor may define terms and concepts in order to describe his/her disclosure by the best method.

In the specification, it should be understood that terms such as "comprise" or "have" are intended to describe the presence of features, numbers, steps, operations, components, parts, or combinations thereof described in the specification, and do not preclude the possibility of the presence of addition of one or more other features, numbers, steps, operations, components, parts, or combinations thereof in advance.

When a certain component is present "in front of," "behind," "above," or "below" another component, it includes not only a case in which the certain component is disposed "in front of," "behind," "above," or "below" another component by being in direct contact with another component but also a case in which other components are disposed therebetween unless otherwise specified. In addition, when a certain component is "connected" to another component, it includes not only a case in which the certain component is directly connected to another component but also a case in which the certain component is indirectly connected to another component unless otherwise specified.

An electro-mechanical drum brake according to embodiments of the present disclosure is an electro-mechanical drum brake, which can accurately measure a magnitude of a force of a brake shoe applied in a rotational radius of a drum and more accurately estimate and control a braking force of a drum brake using information on the measured force.

Hereinafter, in the description of the drawings, the description will be made by defining each direction based on a coordinate axis shown in FIG. 1. More specifically, a positive direction of a y-axis is specified as a forward direction, and a negative direction of the y-axis is specified as a rearward direction. The description will be made by defining a positive direction of a z-axis as an upward direction and a negative direction of the z-axis as a downward direction. A positive direction of an x-axis is specified as a right direction, and a negative direction of the x-axis is specified as a left direction.

Figure 2:
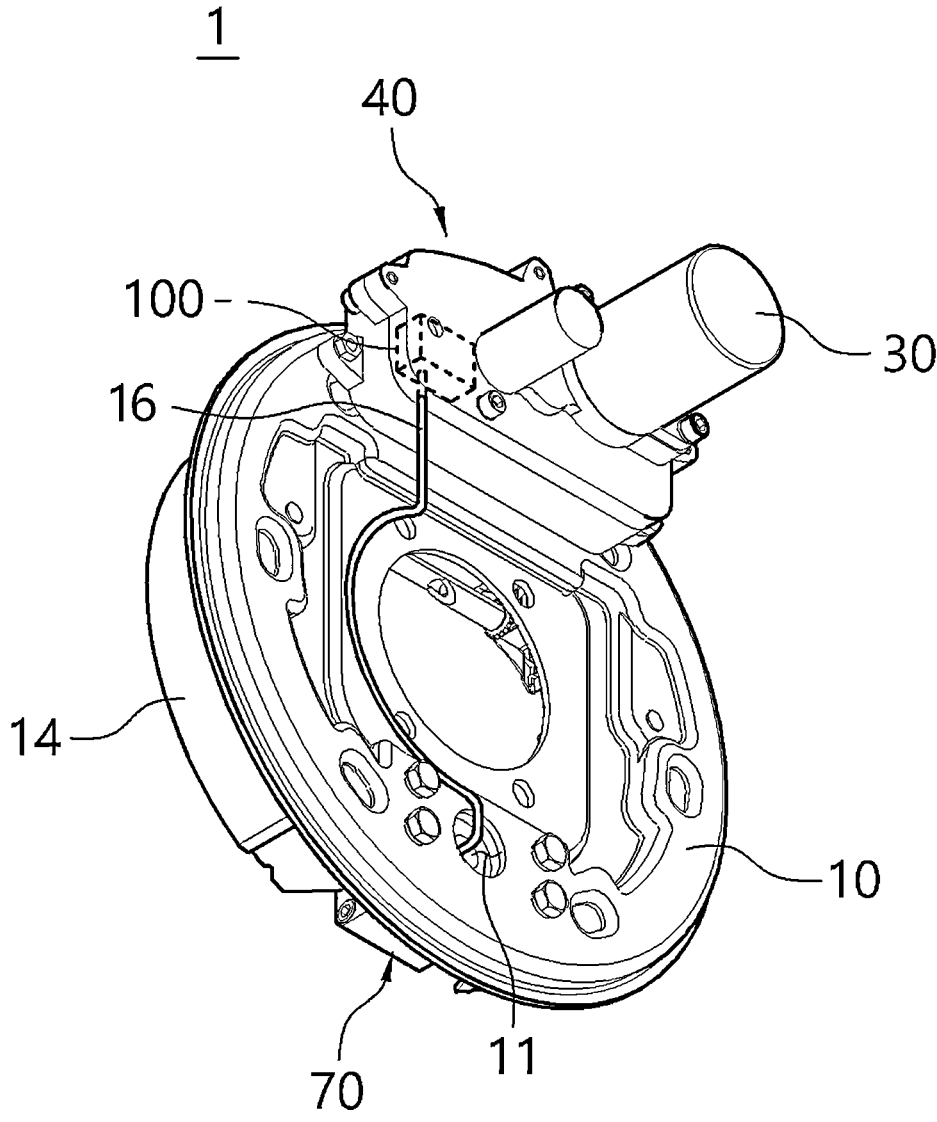
FIG. 2 is a perspective view of the electro-mechanical drum brake according to the first embodiment of the present disclosure at another angle, and in this case, a drum is not shown, and a controller is indicated by a dotted line.
Figure 3:
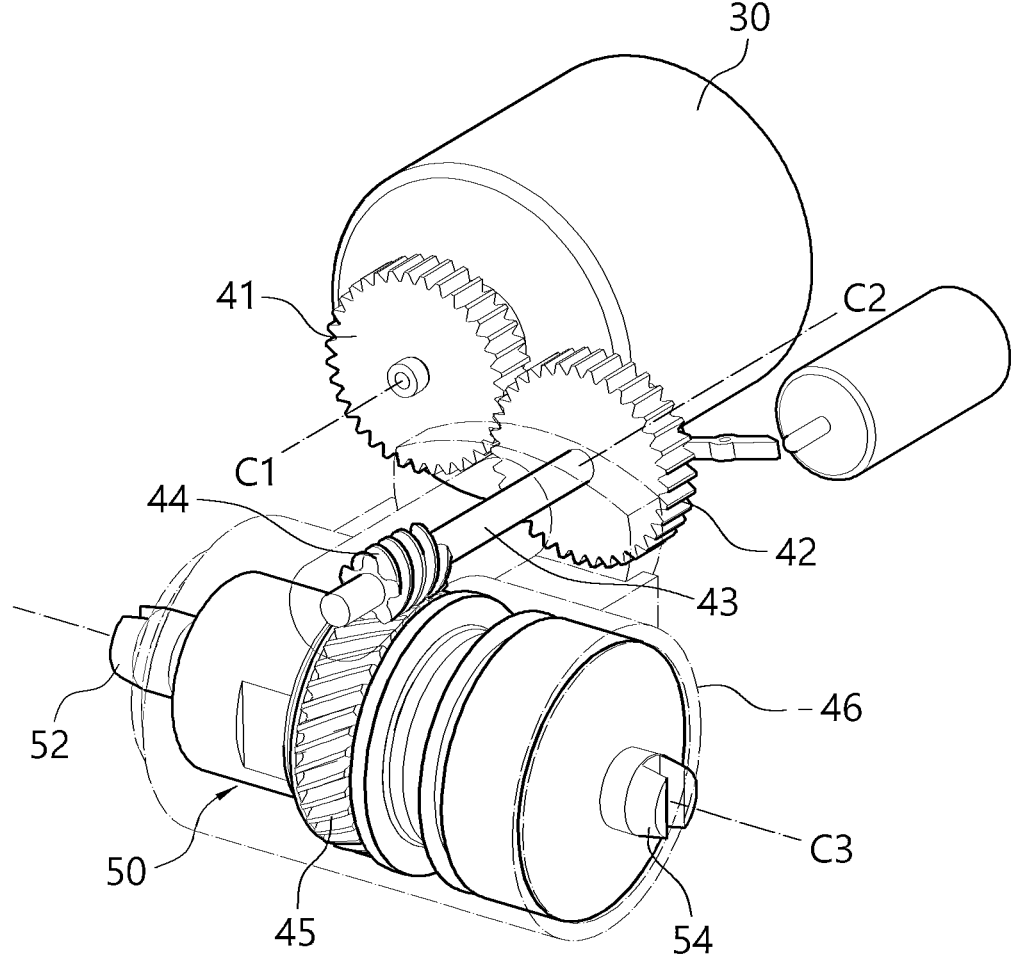
FIG. 3 is a perspective view showing an actuator, a power transmitting member, and a pressing member of the electro-mechanical drum brake according to the first embodiment of the present disclosure, and in this case, a power transmitting member housing is indicated by a dotted line, and components seen through the power transmitting member housing are indicated by solid lines.
Figure 4:
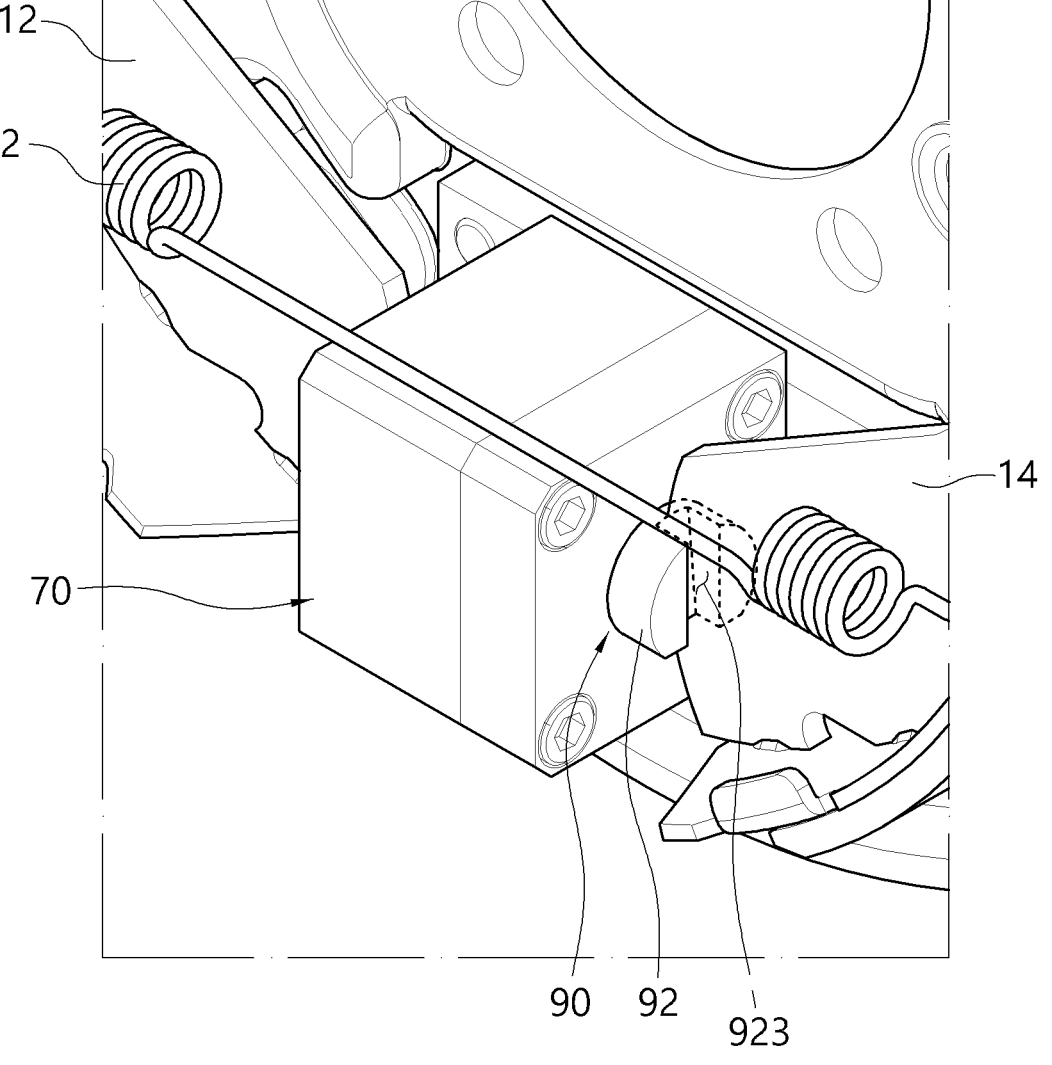
FIG. 4 is a partially enlarged view of the electro-mechanical drum brake of FIG. 1.
Figure 5:
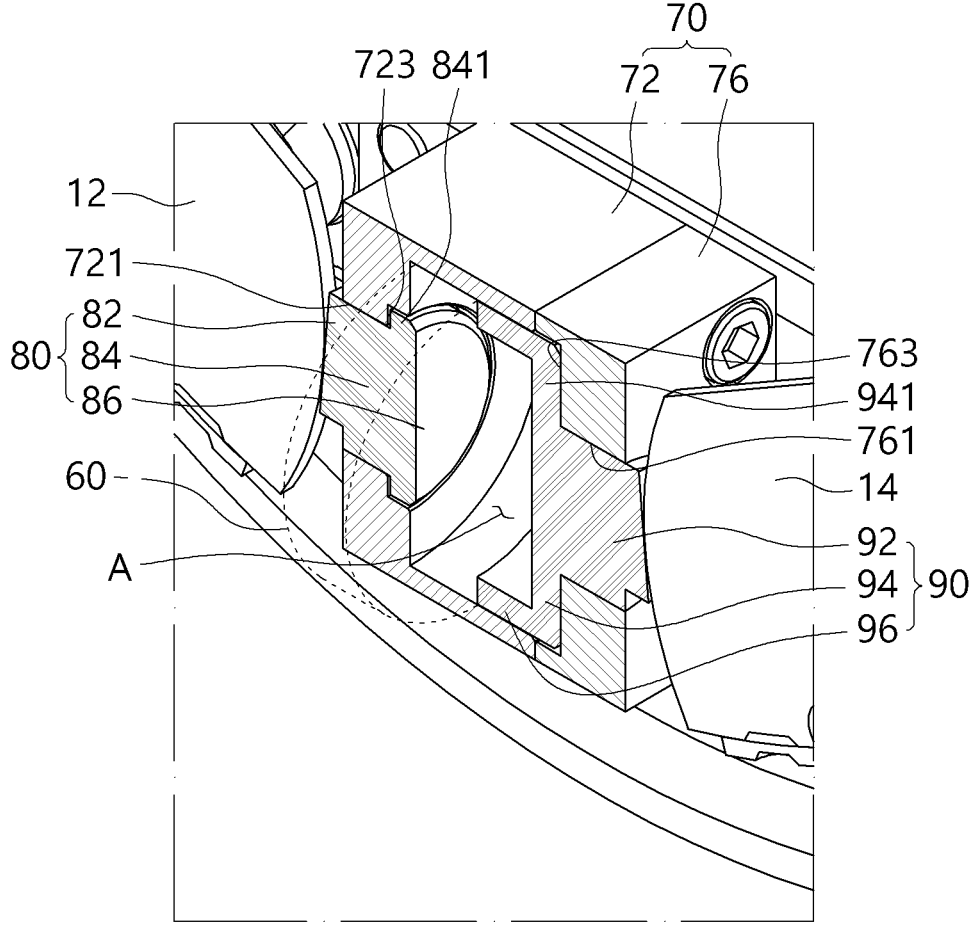
FIG. 5 is a cross-sectional view of a sensor housing and a brake shoe shown in FIG. 4, and for the description of the disclosure, the sensor is indicated by a dotted line, and components seen through the sensor are indicated by solid lines.
Figure 6:
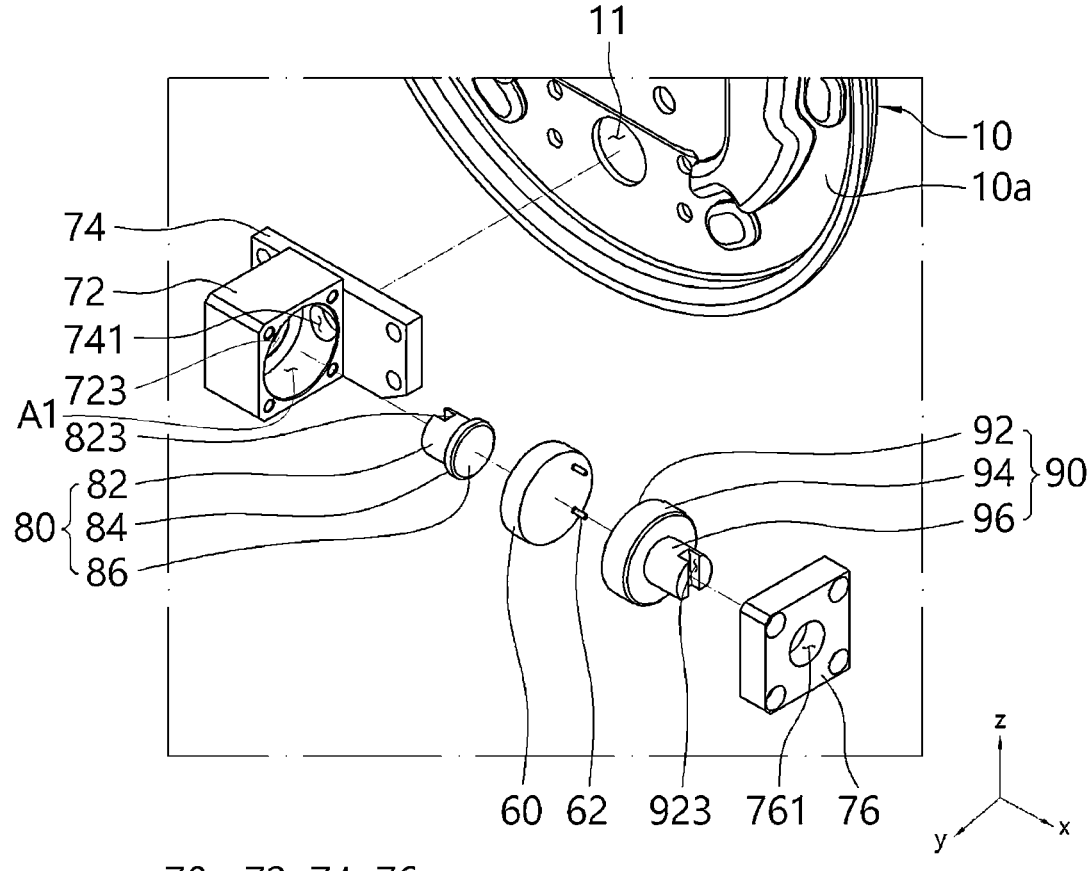
FIGS. 6 and 7 are exploded perspective views of a back plate, the sensor housing, a force transmitting member, and the sensor according to the first embodiment of the present disclosure at different angles.
Figure 7:
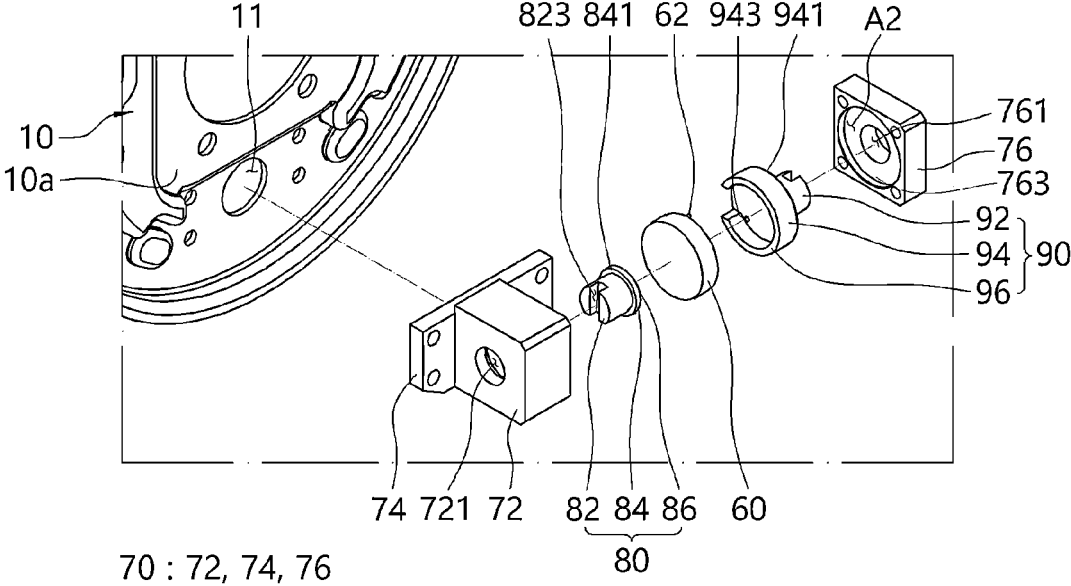
Figure 8:
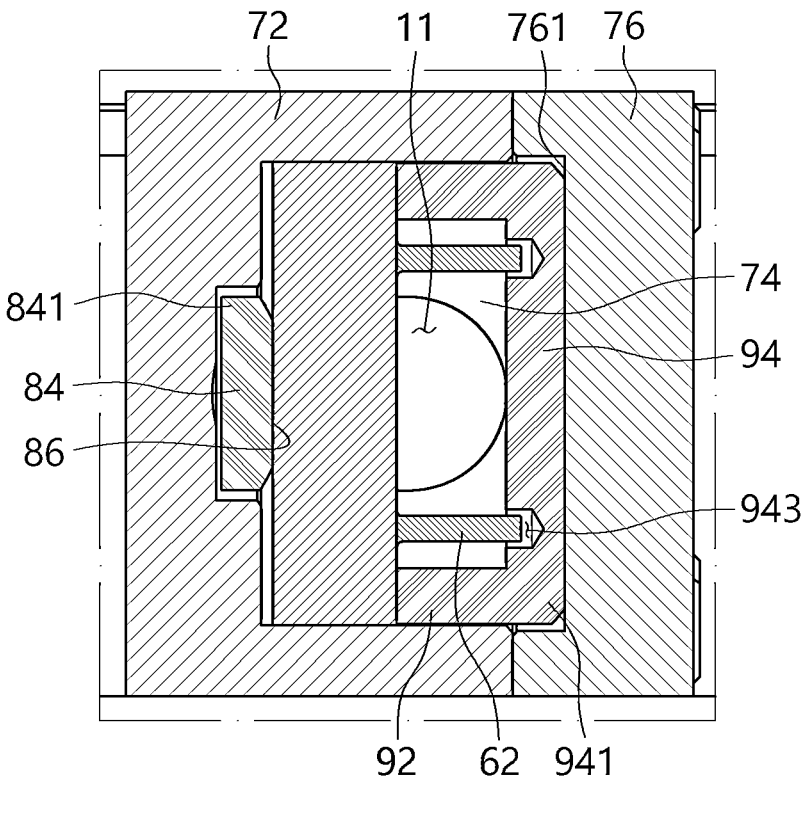
FIG. 8 is a cross-sectional view showing the sensor housing, the sensor, the force transmitting member, and a sensor fixing pin of the electro-mechanical drum brake according to the first embodiment of the present disclosure.
Figure 9A:
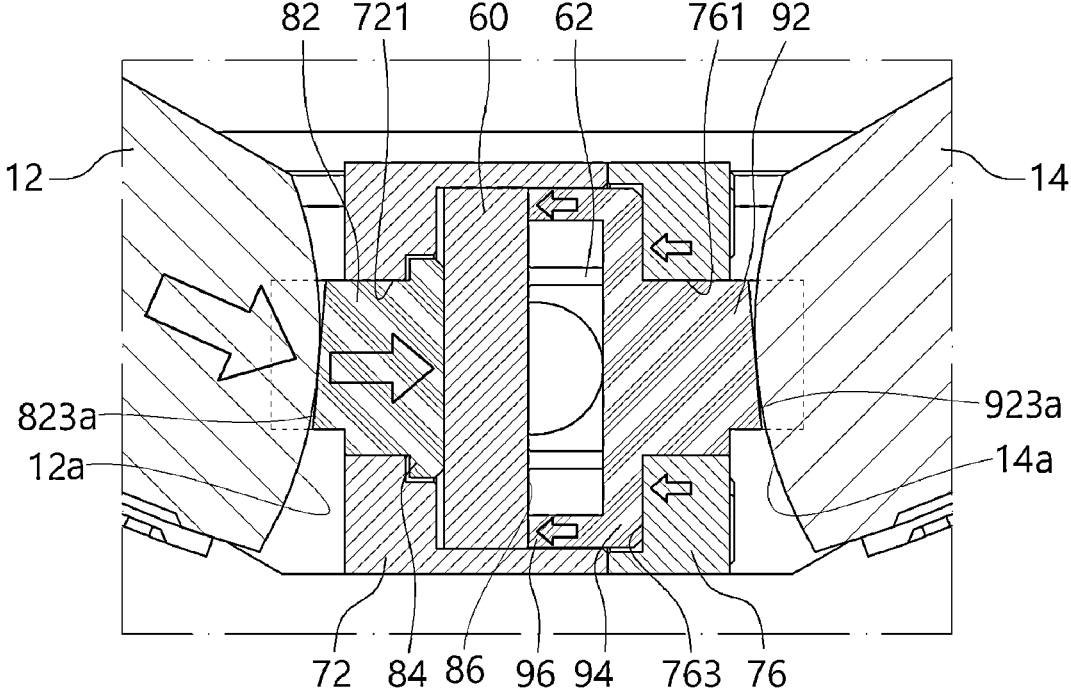
FIGS. 9A and 9B are views for describing a process of measuring a force by the sensor according to the first embodiment of the present disclosure.
Figure 9B:
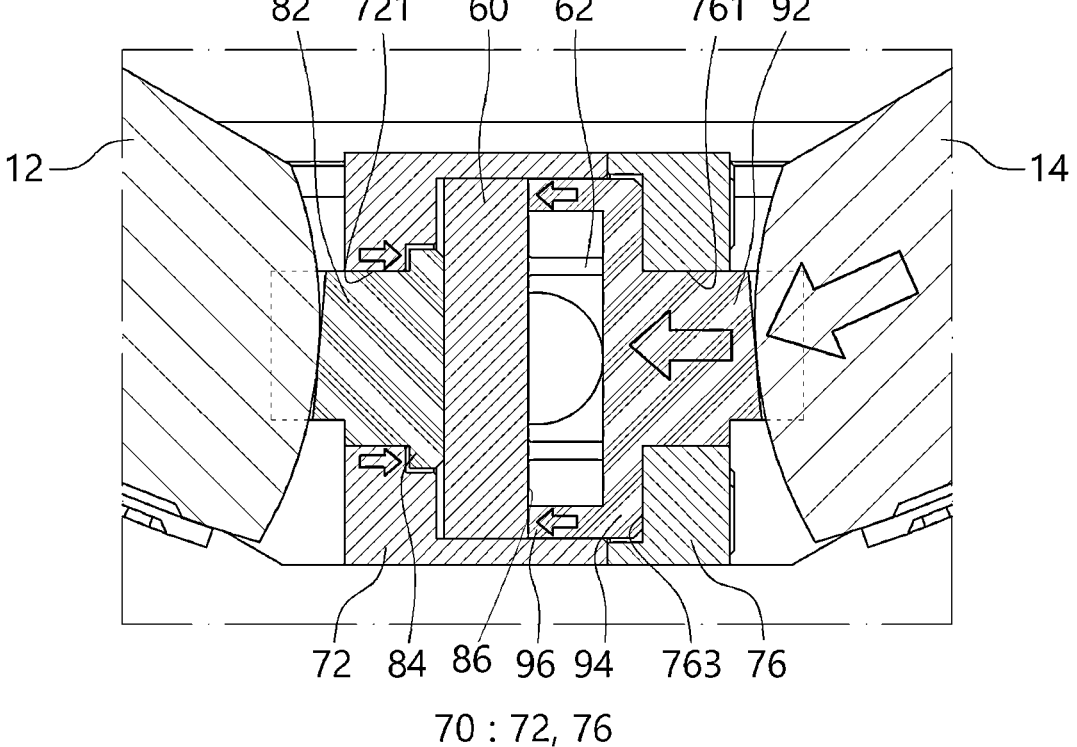

FIG. 1 is an exploded perspective view of an electro-mechanical drum brake according to a first embodiment of the present disclosure. FIG. 2 is a perspective view of the electro-mechanical drum brake according to the first embodiment of the present disclosure at another angle. In this case, a drum is not shown. FIG. 3 is a perspective view showing an actuator, a power transmitting member, and a pressing member of the electro-mechanical drum brake according to the first embodiment of the present disclosure. In this case, a power transmitting member housing is indicated by a dotted line, and components seen through the power transmitting member housing are indicated by solid lines. FIG. 4 is a partially enlarged view of the electro-mechanical drum brake of FIG. 1. FIG. 5 is a cross-sectional view of a sensor housing and a brake shoe shown in FIG. 4. For the description of the disclosure, the sensor is indicated by a dotted line, and components seen through the sensor are indicated by solid lines. FIGS. 6 and 7 are exploded perspective views of a back plate, the sensor housing, a force transmitting member, and the sensor according to the first embodiment of the present disclosure at different angles. FIG. 8 is a cross-sectional view showing the sensor housing, the sensor, the force transmitting member, and a sensor fixing pin of the electro-mechanical drum brake according to the first embodiment of the present disclosure. FIGS. 9A and 9B are views for describing a process of measuring a force by the sensor according to the first embodiment of the present disclosure.

Referring to FIGS. 1 and 2, an electro-mechanical drum brake 1 according to the first embodiment of the present disclosure may include a back plate 10, brake shoes 12 and 14, a drum 20, an actuator 30, a pressing member 50, a sensor 60 (see FIG. 5), a sensor housing 70, and force transmitting members 80 and 90 (see FIG. 5).

The brake shoes 12 and 14 may be installed on a front surface 10a of the back plate 10 to be rotated about a predetermined axis parallel to a y-axis. The brake shoes 12 and 14 may include the first brake shoe 12 and the second brake shoe 14 disposed to face each other on left and right sides of the back plate 10.

The pressing member 50 coupled to upper portions of the first brake shoe 12 and the second brake shoe 14 may be provided on an upper portion of the front surface 10a of the back plate 10. The sensor housing 70 may be disposed on a lower portion of the front surface 10a of the back plate 10. The sensor may be accommodated in the sensor housing 70, and both sides of the sensor may come into contact with the force transmitting member coupled to the brake shoes 12 and 14.

The actuator 30 may be disposed behind the upper portion of the back plate 10. A power transmitting member 40 may be installed between the pressing member 50 and the actuator 30. In this case, the power transmitting member 40 may pass through the back plate 10 to mechanically connect the pressing member 50 and the actuator 30.

The drum 20 may be disposed on the front surface 10a of the back plate 10. The drum 20 may have a cylindrical shape disposed in a horizontal direction so that a rear surface is open and a front surface is closed. The drum 20 may cover the front surface of the back plate 10, and the pressing member 50, the brake shoes 12 and 14, and the sensor housing 70 may be accommodated inside the drum 20.

A central hole may be formed at the center of the front surface of the drum 20, and predetermined coupling members may be provided around the central hole. In this case, a central hole may also be formed at the center of the back plate 10 to correspond to the central hole of the drum 20.

A wheel shaft (not shown) of a vehicle may pass through the central hole of the drum 20 and the central hole of the back plate 10. A wheel (not shown) of the vehicle may be coupled to the drum 20 by the predetermined coupling members provided on the front surface of the drum 20. Therefore, the wheel of the vehicle and the drum 20 may rotate integrally. Meanwhile, the back plate 10 may be supported by a frame (not shown) of the vehicle.

The actuator 30 of the electro-mechanical drum brake 1 according to the first embodiment of the present disclosure may provide a driving force using which the pressing member 50 presses the upper portions of the brake shoes 12 and 14. The power transmitting member 40 may transmit the driving force generated by the actuator 30 to the pressing member 50. In this case, the power transmitting member 40 may also perform a function of adjusting a direction or speed (or power) of the driving force generated by the actuator 30.

The pressing member 50 may push the brake shoes 12 and 14 toward an inner circumferential surface of the drum 20. The brake shoes 12 and 14 may be pressed by the pressing member 50 to advance toward or retreat from the inner circumferential surface of the drum 20.

In this case, outer surfaces of the brake shoes 12 and 14 and the inner circumferential surface of the drum 20 may come into contact with each other to form friction surfaces. The brake shoes 12 and 14 may generate a normal force pressing the inner circumferential surface of the drum 20, and the normal force may generate a frictional force in a direction tangent to the rotational radius of the drum 20.

Hereinafter, the frictional force tangent to the rotational radius of the drum 20 is referred to as a braking force generated by the drum brake. The braking force may generate a torque on the wheel shaft through the drum 20 and the wheel of the vehicle. Hereinafter, this is referred to as a braking torque.

Therefore, the electro-mechanical drum brake 1 according to the first embodiment of the present disclosure may apply the braking torque to the wheel shaft of the vehicle using the braking force applied to the drum 20 by the brake shoes 12 and 14.

Meanwhile, referring to FIGS. 1 to 5, in the embodiment, the sensor 60 may be accommodated inside the sensor housing 70, and the force transmitting members 80 and 90 may be positioned between the sensor 60 and the brake shoes 12 and 14. In this case, the sensor 60 may be disposed on lower portions opposite to the upper portions of the brake shoes 12 and 14 with respect to the rotational axis of the brake shoes 12 and 14.

Therefore, as the brake shoes 12 and 14 rotate in one direction, the upper portion of the first brake shoe 12 and the upper portion of the second brake shoe 14 are opened in a direction away from each other, and the lower portion of the first brake shoe 12 and the lower portion of the second brake shoe 14 may be closed in a direction closer to each other.

The force transmitting members 80 and 90 positioned between the sensor 60 and the brake shoes 12 and 14 may transmit forces, which are applied by closing the brake shoes 12 and 14, to both side portions of the sensor 60. The sensor 60 may measure the forces transmitted by the force transmitting members 80 and 90.

Therefore, the sensor 60 of the electro-mechanical drum brake 1 according to the first embodiment of the present disclosure may directly measure the forces acting between the drum 20 and the brake shoes 12 and 14.

Therefore, the electro-mechanical drum brake 1 according to the first embodiment of the present disclosure may collect information reflecting the characteristics of the drum brake, such as frictional coefficients between the brake shoes 12 and 14 and the drum 20 and a self-boosting action.

Referring to FIG. 3, the power transmitting member 40 of the electro-mechanical drum brake according to the first embodiment of the present disclosure may include first to fourth gears 41, 42, 44, and 45, a power transmitting shaft 43, and a power transmitting member housing 46.

The actuator 30 may be an electric motor for providing a rotational driving force in one or the other direction by an electric force. For example, the electric motor may be a brushless alternating current (AC) motor having a relatively high output power.

A driving force input side of the power transmitting member 40 may be connected to the actuator 30, and a driving force output side thereof may be connected to the pressing member 50. The power transmitting shaft 43 may be disposed on one side of the actuator 30 to be parallel to a rotational shaft C1 of the actuator 30. The power transmitting shaft 43 may be rotatably installed or supported inside the power transmitting member housing 46.

The first gear 41 may be coupled to the rotational shaft C1 of the actuator 30, and the second gear 42 may be coupled to one side of the power transmitting shaft 43. The first gear 41 and the second gear 42 may be engaged with each other. In this case, the first gear 41 and the second gear 42 may be spur gears.

The third gear 44 may be formed on the other side of the power transmitting shaft 43. The third gear 44 may be formed in a worm shape. The third gear 44 may be engaged with the fourth gear 45 coupled to the pressing member 50. The fourth gear 45 may be a worm gear engaged with the third gear 44.

The power transmitting member 40 of the electro-mechanical drum brake 1 according to the first embodiment of the present disclosure can reduce the occurrence of noise by transmitting the rotational driving force of the actuator 30 to the pressing member 50 through the coupling of the worm and the worm gear. However, as long as the first to fourth gears 41, 42, 44, and 45 may transmit the driving force of the actuator 30 to the pressing member 50, the first to fourth gears 41, 42, 44, and 45 are not especially limited to the type and shape thereof.

Referring to FIGS. 1 to 3, in the embodiment, the fourth gear 45 may operate the pressing member 50 by receiving the driving force through the third gear 44. A first pressing part 52 and a second pressing part 54 may be formed on both side portions of the pressing member 50. The first pressing part 52 may be coupled to the upper portion of the first brake shoe 12, and the second pressing part 54 may be coupled to the upper portion of the second brake shoe 14.

As the pressing member 50 operates, the first pressing part 52 and the second pressing part 54 may respectively press and move the first brake shoe 12 and the second brake shoe 14 toward the inner circumferential surface of the drum 20.

Meanwhile, referring back to FIG. 1, the electro-mechanical drum brake 1 according to the first embodiment of the present disclosure may further include an elastic member 13. The elastic member 13 may separate the brake shoes 12 and 14 from the inner circumferential surface of the drum 20 by providing a force to pull the first brake shoe 12 and the second brake shoe 14 toward an inner side of the drum 20.

Therefore, the elastic member 13 may be formed so that the braking forces are not generated by the brake shoes 12 and 14 by preventing the brake shoes 12 and 14 from pressing the inner circumferential surface of the drum 20 in a state in which a user does not operate the brake (i.e., a state in which the pressing member 50 does not press the brake shoes 12 and 14).

Referring to FIGS. 1 to 5, the sensor 60 of the electro-mechanical drum brake 1 according to the first embodiment of the present disclosure may be formed to measure loads of the brake shoes 12 and 14 applied in a direction tangent to the rotational radius of the drum 20. Hereinafter, the direction tangent to the rotational radius of the drum is referred to as a first direction.

Referring to FIGS. 4 and 5, the force transmitting members 80 and 90 of the electro-mechanical drum brake 1 according to the first embodiment of the present disclosure may include the first force transmitting member 80 and the second force transmitting member 90. In addition, the sensor housing 70 may include a first cover part 72, a coupling plate 74, and a second cover part 76.

The sensor 60 may be positioned between the first brake shoe 12 and the second brake shoe 14. The first force transmitting member 80 may be positioned between the sensor 60 and the first brake shoe 12. In addition, the second force transmitting member 90 may be positioned between the sensor 60 and the second brake shoe 14.

An accommodating space A may be formed inside the sensor housing 70, and the sensor 60 may be disposed in the accommodating space A. The first force transmitting member 80 and the second force transmitting member 90 may be coupled to the sensor housing 70 to slide in the first direction.

More specifically, referring to FIGS. 4 to 7, a first through hole 11 may be formed in the lower portion of the back plate 10. The coupling plate 74 and the first cover part 72 may be disposed on the front surface of the back plate 10. In this case, the coupling plate 74 and the first cover part 72 may be integrally formed.

A first space A1 open in a positive direction of the x-axis may be formed inside the first cover part 72. A second through hole 741 may be formed in an inner surface of the first cover part 72 forming the first space A1 to face the back plate 10.

The first through hole 11 may be connected to the second through hole 741. Therefore, the first space A1 may be open to the rear of the back plate 10 through the first and second through holes 11 and 741. A first sliding hole 721 may be formed in the first cover part 72 in the first direction. A cross section of the first sliding hole 721 may be formed to have the same shape as a cross section of a first body portion 82 of the first force transmitting member 80 to be described below.

A first accommodating groove 723 in which a circumferential portion of the first force transmitting member 80 to be described below is seated may be formed in a surface facing one side of the sensor 60 of an inner surface forming the first space A1.

Meanwhile, the first force transmitting member 80 may include a first body portion 82 having a cylindrical shape. A first brake shoe groove 823 may be formed at a left end of the first body portion 82. A first circumferential portion 84 protruding outward from the first body portion 82 and having a greater radius than the first body portion 82 may be provided at a right end of the first body portion 82.

In this case, the right end of the first body portion 82 may be formed in a disk shape having a pressing surface 86 parallel to one surface of the sensor 60. Therefore, the first body portion 82 may come into contact with one surface of the sensor 60 in a large area and press the sensor 60.

Referring back to FIG. 5, the left end of the first body portion 82 may pass through the first sliding hole 721 and then protrude outward from the sensor housing 70. The left end of the first body portion 82 protruding outward from the sensor housing 70 may be coupled to a lower end of the first brake shoe 12.

In this case, the first brake shoe groove 823 may be formed to extend in a vertical direction. Therefore, even when the lower portion of the first brake shoe 12 moves in the vertical direction as the first brake shoe 12 rotates about a predetermined rotational axis, the first force transmitting member 80 and the lower portion of the first brake shoe 12 may not interfere with each other. In other words, the operation of the first brake shoe 12 may not be disturbed by the first force transmitting member 80.

Therefore, the first force transmitting member 80 may be pressed by the first brake shoe 12 only in the first direction and may not receive the force in the vertical direction. In addition, the motion of the first force transmitting member 80 in the first direction may not be interfered with by the vertical motion of the first brake shoe 12.

Referring back to FIGS. 6 and 7, a second space A2 open in a negative direction of the x-axis may be formed inside the second cover part 76. A second sliding hole 761 into which a second body portion 92 of the second force transmitting member 90 to be described below is inserted may be formed on an inner surface forming the second space A2.

Referring to FIG. 5 together, the first cover part 72 and the second cover part 76 may be coupled so that a right surface of the first cover part 72 and the left surface of the second cover part 76 come into contact with each other. In other words, the first cover part 72 and the second cover part 76 may be coupled to form the sensor housing 70. Therefore, both of the first space A1 and the second space A2 may form the accommodating space A of the sensor housing 70.

A second accommodating groove 763 in which a second circumferential portion 94 of the second force transmitting member 90 to be described below is seated may be formed in a circumferential portion of the second sliding hole 761.

The second force transmitting member 90 may have a cylindrical shape extending in the first direction. In this case, a second brake shoe groove 923 may be formed at a right end of the second force transmitting member 90. The second brake shoe groove 923 may be provided in the same manner as the first brake shoe groove 823 described above.

The second body portion 92 of the second force transmitting member 90 may be inserted into the second sliding hole 761. The second circumferential portion 94 having a greater radius than the second body portion 92 may be formed at a left end of the second body portion 92. The second circumferential portion 94 may be seated in the second accommodating groove 763 of the second cover part 76.

A pressing protrusion 96 protruding toward the sensor 60 in the first direction may be formed at an outer corner of the second circumferential portion 94. As the second force transmitting member 90 moves in the first direction, the pressing protrusion 96 of the second force transmitting member 90 may press a right edge portion of the sensor 60.

Meanwhile, the sensor 60 may have a disk shape having a predetermined thickness. In this case, the sensor 60 may be a load sensor or a load cell sensor. The accommodating space A of the sensor housing 70 may be formed in the first direction. In this case, a cross-sectional shape of the accommodating space A of the sensor housing 70 may be formed in the same shape as the cross-sectional shape of the sensor 60. Therefore, the sensor 60 may slide in the first direction.

Referring to FIGS. 6 to 8, a fixing pin 62 arranged in the first direction may be coupled to one side of the sensor 60 according to the first embodiment of the present disclosure. A fixing pin groove 943 into which the fixing pin 62 is inserted may be formed in a portion corresponding to the fixing pin 62 of the second force transmitting member 90. In this case, a plurality of fixing pins 62 may be formed.

Therefore, the sensor 60 and the second force transmitting member 90 may be relatively movable in the first direction, but may be limited not to relatively move in another direction. In other words, the fixing pin 62 inserted into and supported by the fixing pin groove 943 can prevent the sensor 60 from rotating in the accommodating space A.

Therefore, the sensor 60 can accurately measure a force applied in the first direction. Meanwhile, the fixing pin 62 and the fixing pin groove 943 may also perform a function of guiding a relative motion of the sensor 60 and the second force transmitting member 90 in the first direction.

Referring to FIG. 8, in the embodiment, the fixing pin 62 may be formed so that a length of a portion inserted into the fixing pin groove 943 is shorter than or equal to a depth of the fixing pin groove 943 in a state in which the sensor 60 is in contact with the second force transmitting member 90.

Therefore, an end of the fixing pin 62 and a bottom surface of the fixing pin groove 943 may not come into contact with each other. In other words, a right portion of the sensor 60 may be supported by only the pressing protrusion

96 of the second force transmitting member 90. Therefore, the sensor 60 can accurately measure forces in the first direction transmitted by the force transmitting members 80 and 90 without the influence of the fixing pin 62 and the fixing pin groove 943.

Hereinafter, a process of measuring a force in the first direction by the braking force of the brake shoe by the sensor according to one embodiment of the present disclosure will be described in more detail.

Referring to FIG. 9A, the sensor 60 of the electro-mechanical drum brake according to the first embodiment of the present disclosure may measure a force applied by the first brake shoe 12 in the first direction.

In other words, as the upper portion of the first brake shoe 12 is moved by being pressed leftward by the pressing member 50, the lower portion of the first brake shoe 12 may be moved rightward. The lower portion of the first brake shoe 12 moved rightward may press one end of the first force transmitting member 80 rightward.

The first body portion 82 of the first force transmitting member 80 pressed by the first brake shoe 12 may slide along the first sliding hole 721 and press the sensor 60 rightward. The sensor 60 pressed by the first force transmitting member 80 may come into contact with the second force transmitting member 90 after sliding rightward in the accommodating space A.

After the sensor 60 and the second force transmitting member 90 come into contact with each other, the second circumferential portion 94 of the second force transmitting member 90 may be seated in the second accommodating groove 763 and thus supported by an inner wall of the sensor housing 70. Therefore, the sensor 60 may be fixedly positioned at a predetermined position inside the accommodating space A, and the force applied by the first brake shoe 12 in the first direction may be stably measured.

Referring to FIG. 9B, the sensor 60 of the electro-mechanical drum brake 1 according to the first embodiment of the present disclosure may measure the force applied by the second brake shoe 14 in the first direction.

In other words, as the upper portion of the second brake shoe 14 is moved by being pressed rightward by the pressing member 50, the lower portion of the second brake shoe 14 may be moved leftward. The lower portion of the second brake shoe 14 moved leftward may press one end of the second force transmitting member 90 leftward.

The second body portion 92 of the second force transmitting member 90 pressed by the second brake shoe 14 may slide along the second sliding hole 761 and press the sensor 60 leftward. The sensor 60 pressed by the second force transmitting member 90 may come into contact with the first force transmitting member 80 after sliding leftward in the accommodating space A.

After the sensor 60 and the first force transmitting member 80 come into contact with each other, the first circumferential portion 84 of the first force transmitting member 80 may be seated in the first accommodating groove 723 and thus supported by the inner wall of the sensor housing 70. Therefore, the sensor 60 may fixedly positioned at a predetermined position inside the accommodating space A, and the force applied by the second brake shoe 14 in the first direction may be stably measured.

As described above, in the electro-mechanical drum brake according to the first embodiment of the present disclosure, the force transmitting members 80 and 90 may be formed to slide in the first direction, and thus as the brake shoes 12 and 14 generate the braking forces, the forces applied to the brake shoes 12 and 14 in the first direction can be accurately measured.

In addition, in the electro-mechanical drum brake according to the first embodiment of the present disclosure, after the sensor 60 slides inside the accommodating space A in the first direction, both sides of the sensor 60 is supported by the force transmitting member 80 and 90, and thus all forces applied by the first and second brake shoes 12 and 14 in the first direction may be measured by only one sensor 60.

Meanwhile, referring to FIG. 9, lower ends of the brake shoes 12 and 14 coupled to the brake shoe grooves of the force transmitting member 80 and 90 may be formed to have rounded curved portions 12a and 14a. In other words, the curved portions 12a and 14a of the brake shoes 12 and 14 may be convexly formed to protrude toward the force transmitting members 80 and 90. In addition, bottom surfaces 823a and 923a of the brake shoe grooves coming into contact with the lower ends of the brake shoes 12 and 14 may be formed to be inclined toward one side at a predetermined angle.

The lower ends of the brake shoes 12 and 14 according to the first embodiment of the present disclosure may roll on the bottom surfaces 823a and 923a of the brake shoe grooves and press the force transmitting members 80 and 90. In other words, in the electro-mechanical drum brake according to the first embodiment of the present disclosure, the motions of the brake shoes 12 and 14, the force transmitting members 80 and 90, and the sensor 60 can be smoothly connected and a sudden impact therebetween can be prevented. Therefore, the electro-mechanical drum brake according to the first embodiment of the present disclosure can have improved durability and minimize vibrations caused by the operations of the brake shoes 12 and 14.

Meanwhile, a buffer member (not shown) may be formed on the pressing surface 86 of the first force transmitting member 80 and the pressing protrusion 96 of the second force transmitting member 90. The buffer member is a component for canceling movement distances of the force transmitting members 80 and 90 increased due to the abrasion of the brake shoes 12 and 14 or the like. Therefore, the electro-mechanical drum brake according to the first embodiment of the present disclosure can measure a force in the first direction even when the movement distances of the force transmitting members 80 and 90 increase due to the abrasion of the brake shoes 12 and 14 or the like and improve the durability of this electro-mechanical drum brake.

Referring back to FIG. 2, the electro-mechanical drum brake 1 according to the first embodiment of the present disclosure may further include a controller 100. The controller 100 may be installed on the back plate 10. For example, the controller 100 may be protected by being installed inside the power transmitting member housing 46.

In this case, the controller 100 may be electrically connected to the actuator 30 and the sensor to receive electrical signals from the actuator 30 and the sensor. In addition, the controller 100 may transmit a signal for controlling the actuator 30 to the actuator 30 after performing a predetermined calculation process using the received electrical signals. Meanwhile, the controller 100 may also be electrically connected to another control unit (not shown) installed in the vehicle.

Hereinafter, an example of a calculation process to be performed by the controller 100 to control the actuator 30 using information received from the actuator 30 and the sensor will be described.

Referring to FIGS. 1 to 5, the sensor 60 of the electro-mechanical drum brake 1 according to the first embodiment of the present disclosure may measure a forces applied by the brake shoes 12 and 14 in the first direction and convert the measured result into data. Hereinafter, the data generated by the sensor 60 is referred to as first information.

The sensor 60 may convert the first information into an electrical signal and transmit the electrical signal to the controller 100. The first information may include information on forces directly applied by the brake shoes 12 and 14. Therefore, the first information may include the characteristics of the drum brake, such as a self-boosting action and a frictional coefficient.

The actuator 30 may be an electric motor, and the controller 100 may receive information on the magnitude of a current flowing through the actuator 30 from the actuator 30. Hereinafter, the information on the current flowing through the actuator 30 is referred to as second information. Since the second information is collected information not related to the brake shoes 12 and 14, the second information does not include the characteristics of the drum brake.

The controller 100 may compare the received first and second information with third information. In this case, the third information may refer to information recorded in a data storage unit provided in the controller 100. In addition, the third information may refer to information received from another control unit.

In this case, the third information may refer to a set of data collected in advance on the current flowing through the actuator 30, the forces applied by the brake shoes 12 and 14 in the first direction, and the actual braking force generated by the drum brake.

For example, the third information may refer to the set of the data on the magnitude of the current flowing through the actuator 30, the magnitudes of the forces applied by the brake shoes 12 and 14 in the first direction, and the magnitude of the actual braking force corresponding to the magnitude of the force. The third information may be acquired and then stored as data by performing repeated experiments in a predetermined experimental room.

Thereafter, the controller 100 may estimate a braking force based on the comparison result. As described above, since the controller 100 according to the first embodiment of the present disclosure may use the first information including the characteristics of the drum brake, the braking force of the brake can be accurately estimated.

In addition, the controller 100 according to the first embodiment of the present disclosure may compare the estimated braking force and an input braking force. In this case, the input braking force may refer to a braking force to be generated by a user using the brake.

The input braking force may be determined by the controller 100. For example, when a driver operates a brake pedal (not shown), the controller 100 may measure a movement distance of the brake pedal (not shown). The controller 100 may determine the input braking force based on the measured movement distance.

Thereafter, the controller 100 may control the actuator 30 based on the comparison result of the input braking force and the estimated braking force. For example, when a magnitude of the estimated braking force is smaller than a magnitude of the input braking force, the controller 100 may increase the output power of the actuator 30 by controlling more current to flow through the actuator 30. The controller 100 may control the actuator 30 so that a difference between the estimated braking force and the input braking force is smaller and smaller by repeating the calculation and control process described above.

As described above, the controller 100 according to the first embodiment of the present disclosure may more precisely control the braking force of the brake using the information including the characteristics of the drum brake.

Meanwhile, referring back to FIG. 2, the electro-mechanical drum brake 1 according to the first embodiment of the present disclosure may further include an electrical line 16 for electrically connecting the sensor and the controller 100. The electrical line 16 may be disposed on a rear surface of back plate 10. One end of the electrical line 16 may be connected to the sensor 60 through a through hole of the back plate 10, and the other end thereof may be connected to the controller 100.

Therefore, the electro-mechanical drum brake 1 according to the first embodiment of the present disclosure can minimize the influence of frictional heat, vibrations, and the like generated by friction between the drum 20 and the brake shoes, and thus transmit undamaged information to the controller 100.

In addition, in the electro-mechanical drum brake 1 according to the first embodiment of the present disclosure, the controller 100 can receive and use the undamaged information from the sensor 60, thereby more accurately estimating the braking force of the drum brake and controlling the actuator 30 more precisely.

Hereinafter, an electro-mechanical drum brake according to a second embodiment of the present disclosure will be described.

Figure 10A:
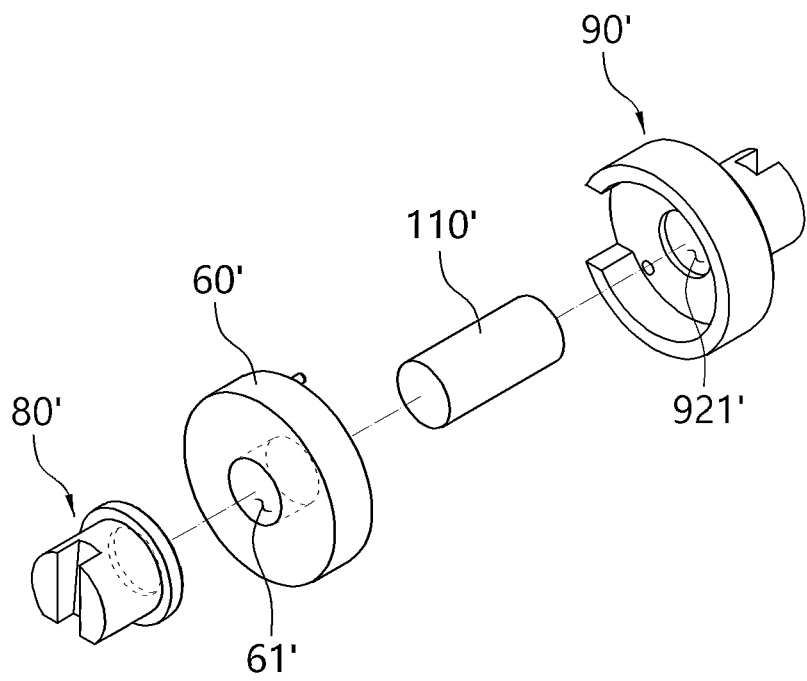
FIGS. 10A and 10B are exploded perspective views of a force transmitting member, a sensor, and a guide member according to a second embodiment of the present disclosure at different angles.
Figure 10B:
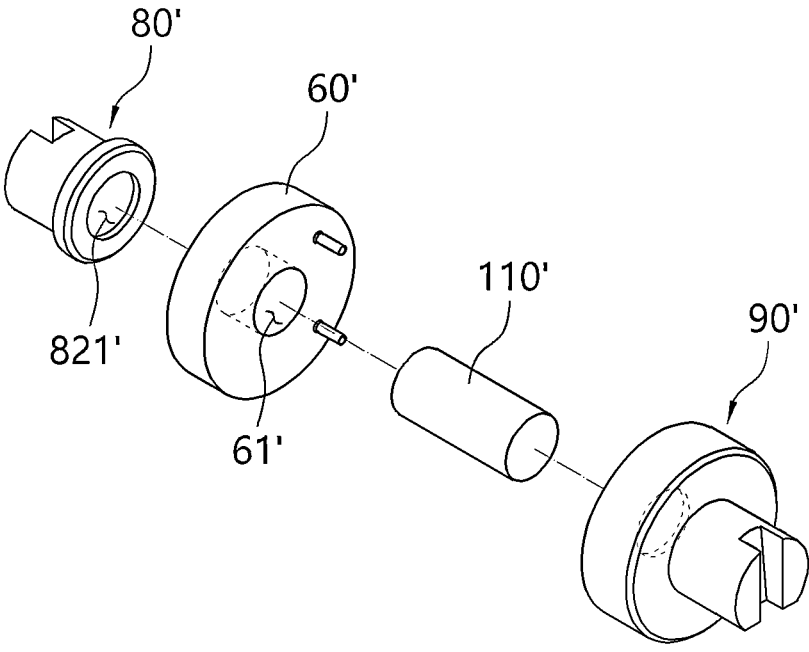
Figure 11:
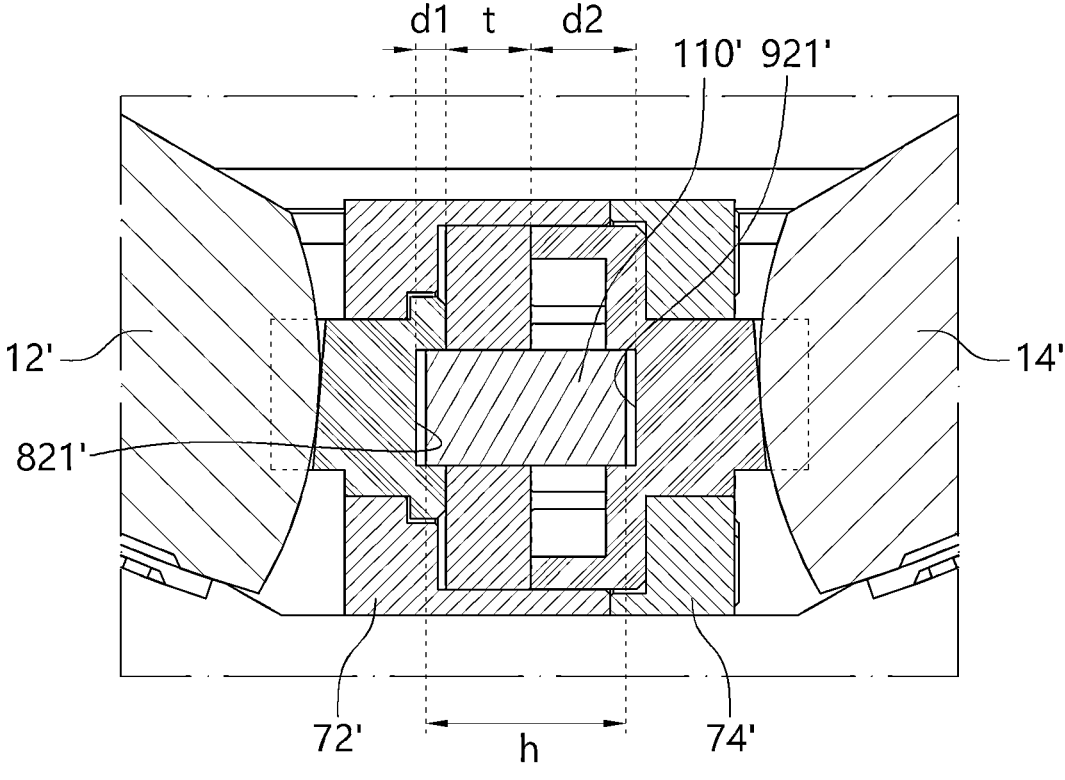
FIG. 11 is a cross-sectional view of a brake shoe, the force transmitting member, the sensor, and a sensor housing of an electro-mechanical drum brake according to the second embodiment of the present disclosure.

FIGS. 10A and 10B are exploded perspective views of a force transmitting member, a sensor, and a guide member according to the second embodiment of the present disclosure at different angles. FIG. 11 is a cross-sectional view of a brake shoe, the force transmitting member, the sensor, and a sensor housing of the electro-mechanical drum brake according to the second embodiment of the present disclosure.

Since the electro-mechanical drum brake according to the second embodiment of the present disclosure may have the same configuration as in the first embodiment except for the force transmitting member and the sensor, a description thereof will be omitted, and the force transmitting member and the sensor according to the second embodiment of the present disclosure will be described.

Referring to FIGS. 10 and 11, the electro-mechanical drum brake according to the second embodiment of the present disclosure may further include a guide member capable of guiding a motion of a sensor 60' in the first direction.

The guide member may be formed of a rod-shaped guide rod 110'. A guide hole 61' may be formed at the center of the sensor 60' in the first direction so that the guide rod 110' passes therethrough. A first guide groove 821' into which one end of the guide rod 110' may be inserted may be formed in a side of a first force transmitting member 80' facing the sensor 60', and a second guide groove 921' into which the other end of the guide rod 110' may be inserted may be formed in a side of a second force transmitting member 90' facing the sensor 60'.

The guide rod 110' can prevent the vibrations of the sensor 60' in another direction other than the first direction even while guiding the motion of the sensor 60' in the first direction, and thus a force applied by the brake shoe in the first direction can be accurately measured.

Meanwhile, the guide rod 110' of the electro-mechanical drum brake according to the second embodiment of the present disclosure may be made of an elastic material. For example, the guide rod 110' may be made of plastic or rubber. Therefore, the guide rod 110' according to the second embodiment of the present disclosure can reduce the impact and noise which may occur between the guide rod 110', the sensor 60', and the force transmitting members 80' and 90'.

In addition, referring back to FIG. 11, the guide rod 110' according to the second embodiment of the present disclosure may be provided to move relative to the first force transmitting member 80' and the second force transmitting member 90'. In other words, a length h of the guide rod 110' in the first direction may be formed to be smaller than or equal to the sum of a depth d1 of the first guide groove 821' in the first direction, a thickness t of the sensor 60' in the first direction, and a depth d2 of the second guide groove 921' in the first direction in a state in which both side portions of the sensor 60' come into contact with all of the first and second force transmitting members 80' and 90'.

Therefore, both ends of the guide rod 110' may not come into contact with a bottom surface of the first guide groove 821' and a bottom surface of the second guide groove 921'. Therefore, the guide rod 110' may not apply a force to the force transmitting members 80' and 90' in the first direction, and all of the forces in the first direction transmitted by the force transmitting members 80' and 90' may be applied to the sensor 60'.

Therefore, according to the second embodiment of the present disclosure, the guide rod 110' may slide on outer inner circumferential surfaces of the first guide groove 821', the second guide groove 921', and the guide hole 61' and perform both of a function of guiding the sensor 60' to move in the first direction and a function of preventing the sensor 60' from vibrating or tilting in another direction. In addition, the sensor 60' can accurately measure the force applied in the first direction without the interference effect by the guide rod 110'.

Hereinafter, an electro-mechanical drum brake according to a third embodiment of the present disclosure will be described.

Figure 12:
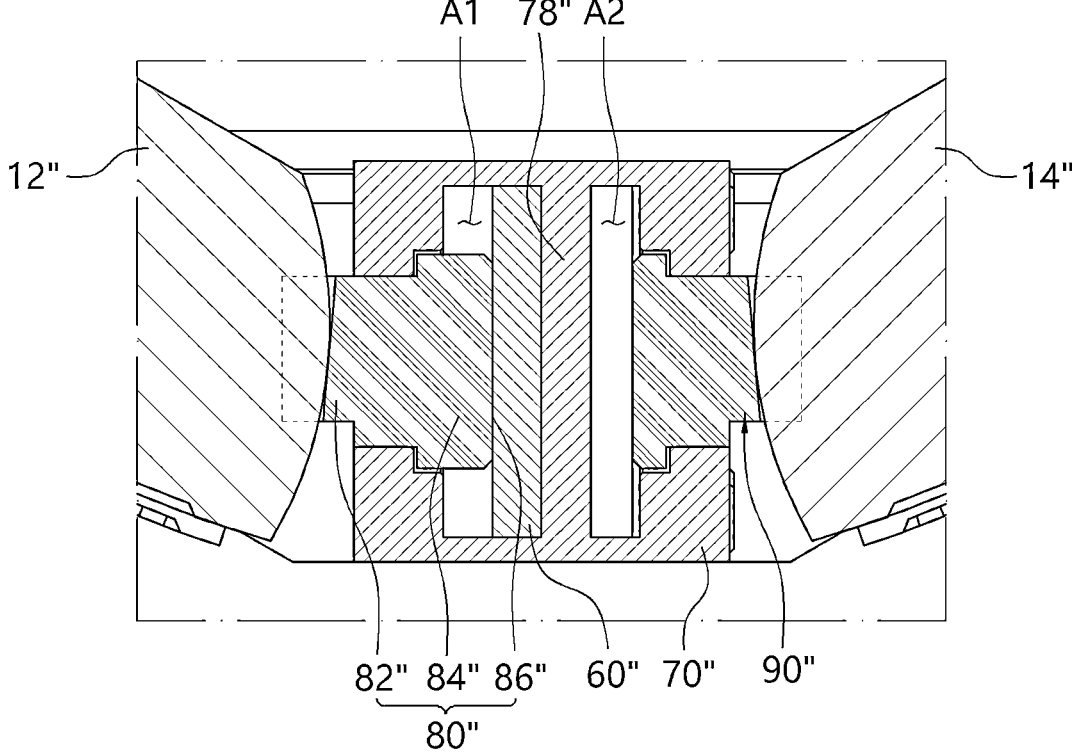
FIG. 12 is a cross-sectional view of a brake shoe, a force transmitting member, a sensor, and a sensor housing of an electro-mechanical drum brake according to a third embodiment of the present disclosure.

FIG. 12 is a cross-sectional view of a brake shoe, a force transmitting member, a sensor, and a sensor housing of the electro-mechanical drum brake according to the third embodiment of the present disclosure.

In the third embodiment of the present disclosure, a description of a configuration which is the same as or similar to that of the first embodiment will be omitted, and a sensor housing which may be formed differently from the first embodiment will be described in more detail.

Referring to FIG. 12, a sensor housing 70" may be provided with a support part 78" capable of supporting one side of a sensor 60" accommodated inside the sensor housing 70". Accommodating spaces A1" and A2" of the sensor housing 70" are the sensor accommodating space A1" and a sensor 60 non-accommodating space A2" divided by the support part 78".

One side of the sensor 60" accommodated in the sensor accommodating space A1" in the first direction may be supported by the support part 78" of the sensor housing 70", and the other side thereof in the first direction may come into contact with a first force transmitting member 80".

One side of the first force transmitting member 80" may be pressed by a first brake shoe 12", and the first force transmitting member 80" may slide to an inner side of the sensor housing 70" and then press the sensor 60". The sensor 60" having one side portion pressed by the first force transmitting member 80" and the other side portion supported by the support part may measure the force applied by the first brake shoe 12" in the first direction.

In this case, the first brake shoe 12" may be a leading shoe. The leading shoe may refer to a brake shoe extending in a direction in which the drum rotates, and a trailing shoe may refer to a brake shoe extending in an opposite direction. Since the leading shoe generates a self-boosting action, information on a force applied by the leading shoe may include more characteristics of the drum brake.

Meanwhile, a buffer member (not shown) having elasticity may be installed on a pressing surface of the first force transmitting member 80". The buffer member is a component for canceling the movement distance of the first force transmitting member 80" in the first direction increased due to the abrasion of the first brake shoe 12".

Therefore, the electro-mechanical drum brake according to the third embodiment of the present disclosure can prevent the sensor 60" from being damaged even when the movement distance of the first force transmitting member 80" in the first direction increases due to the abrasion of the first brake shoe 12" or the like, thereby improving durability.

Alternatively, a return spring (not shown) may be disposed in the sensor non-accommodating space A2" of the sensor housing 70". The return spring may be disposed to have one side coming into contact with the support part and the other side coming into contact with a second force transmitting member 90". The return spring may perform a function of maintaining contact between a lower portion of a second brake shoe 14" and the second force transmitting member 90" by providing an elastic force for returning the second force transmitting member 90" to a right correct position.

With the above configuration, the electro-mechanical drum brake according to embodiments of the present disclosure can be configured to position a force transmitting member capable of sliding in a direction tangent to a rotational radius of a drum between brake shoes and press a sensor capable of measuring a load in the direction tangent to the rotational radius of the drum, thereby accurately measuring a force of the brake shoe applied in the direction tangent to the rotational radius of the drum.

In addition, the electro-mechanical drum brake according to the embodiments of the present disclosure can be configured to estimate, by a controller, a braking force using information on the force applied by the brake shoe and information on a driving force of an actuator for coming the brake show into close contact with the drum, thereby accurately estimating the braking force of the brake shoe.

The effects of the present disclosure are not limited to the above-described effects and should be understood as including all effects inferable from a configuration of the disclosure described in the detailed description or the claims of the present disclosure.

Although embodiments of the present disclosure have been described, the spirit of the present disclosure is not limited by the embodiments presented herein, and those skilled in the art who understand the spirit of the present disclosure may easily propose other embodiments by adding, changing, deleting, and adding a component within the same spirit, but other embodiments are also included in the scope of the spirit of the present disclosure.

What is claimed is:

1. An electro-mechanical drum brake comprising:
   a back plate;
   a drum disposed on one side of the back plate;

a first brake shoe and a second brake shoe rotatably coupled on one surface of the back plate;

a pressing member configured to press one side of each of the first brake shoe and the second brake shoe so that the first brake shoe and the second brake shoe advance toward or retreat from an inner circumferential surface of the drum;

an actuator configured to provide a driving force so that the pressing member presses the first and second brake shoes;

a sensor positioned between the other sides of the first and second brake shoes, and configured to measure loads of the first and second brake shoes applied in a first direction tangent to a rotational direction of the drum; and a controller installed on the back plate and electrically connected to the actuator and the sensor, wherein the controller is configured to estimate braking force by the first brake shoe and the second brake shoe based on information acquired from the sensor and information acquired from the actuator.

2. The electro-mechanical drum brake of claim 1, further comprising:

a first force transmitting member positioned between the first brake shoe and the sensor so that one side of the first force transmitting member comes into contact with the first brake shoe and the other side comes into contact with one side of the sensor; and a second force transmitting member positioned between the second brake shoe and the sensor so that one side of the second force transmitting member comes into contact with the second brake shoe and the other side comes into contact with the other side of the sensor.

3. The electro-mechanical drum brake of claim 2, wherein the first force transmitting member and the second force transmitting member are formed to slide in the first direction.

4. The electro-mechanical drum brake of claim 3, further comprising a sensor housing fixedly coupled to the back plate and having an accommodating space therein to accommodate the sensor, wherein the first force transmitting member and the second force transmitting member are coupled to the sensor housing to slide in the first direction.

5. The electro-mechanical drum brake of claim 4, wherein the accommodating space is formed in the first direction so that the sensor is supported after sliding in the first direction.

6. The electro-mechanical drum brake of claim 4, wherein the first force transmitting member includes:

a body portion slidably coupled to the sensor housing, and having one side protruding outward from the sensor housing and the other side coming into contact with the one side of the sensor; and a circumferential portion provided on the one side of the body portion, and the circumferential portion is formed to protrude outward from the body portion to have a greater radius than the body portion.

7. The electro-mechanical drum brake of claim 6, wherein an accommodating groove for accommodating the circumferential portion is formed in an inner wall of the sensor housing defining the accommodating space.

8. The electro-mechanical drum brake of claim 2, further comprising a guide member that guides a motion of the sensor so that the sensor moves in the first direction.

9. The electro-mechanical drum brake of claim 8, wherein the guide member includes a guide rod passing through the sensor and arranged in the first direction, and the guide rod has both ends, each of which is coupled to one of the first force transmitting member and the second force transmitting member.

10. The electro-mechanical drum brake of claim 9, wherein the guide rod is formed to move relative to the first force transmitting member and the second force transmitting member.

11. The electro-mechanical drum brake of claim 9, wherein the guide rod is made of an elastic material.

12. The electro-mechanical drum brake of claim 2, wherein the other side of the sensor is coupled to a fixing pin arranged in the first direction, and a fixing pin groove into which the fixing pin is inserted is formed in the second force transmitting member.

13. The electro-mechanical drum brake of claim 12, wherein the fixing pin is formed so that a length of a portion inserted into the fixing pin groove is shorter than or equal to a depth of the fixing pin groove in a state in which the sensor and the second force transmitting member are in contact with each other.

14. The electro-mechanical drum brake of claim 1, wherein the first brake shoe rotates about a first axis, and the other side of the first brake shoe is positioned on a side opposite to one side of the first brake shoe with respect to the first axis.

15. The electro-mechanical drum brake of claim 1, wherein an electrical line for electrically connecting the sensor and the controller is provided on the other surface of the back plate.

16. An electro-mechanical drum brake comprising:

a back plate;

a drum disposed on one side of the back plate;

a first brake shoe rotatably coupled to one surface of the back plate;

a pressing member configured to press one side of the first brake shoe so that the first brake shoe advances toward or retreats from an inner circumferential surface of the drum;

an actuator configured to provide a driving force so that the pressing member presses the first brake shoe;

a sensor having one side connected to the other side of the first brake shoe and the other side formed to be supported by the back plate, and configured to measure a load applied in a first direction tangent to a rotational direction of the drum; and a controller installed on the back plate and electrically connected to the actuator and the sensor, wherein the controller is configured to estimate braking force by the first brake shoe and the second brake shoe based on information acquired from the sensor and information acquired from the actuator.

17. The electro-mechanical drum brake of claim 16, wherein the first brake shoe is a leading shoe.

18. The electro-mechanical drum brake of claim 16, further comprising a sensor housing fixedly coupled to the back plate and having an accommodating space therein to accommodate the sensor, wherein the other side of the sensor is supported by an inner wall of the sensor housing defining the accommodating space.

19. The electro-mechanical drum brake of claim 18, further comprising a force transmitting member including a body portion slidably coupled to the sensor housing and having one side protruding outward from the sensor housing and the other side coming into contact with the one side of the sensor and a circumferential portion formed on the one side of the body portion, wherein the circumferential portion is formed to protrude outward from the body portion to have a greater radius than the body portion.

* * * * *